United States Patent
Ollila et al.

(10) Patent No.: US 12,447,229 B2
(45) Date of Patent: Oct. 21, 2025

(54) BONE IMPLANT

(71) Applicant: BONALIVE OY, Turku (FI)

(72) Inventors: Fredrik Ollila, Abo (FI); Nina Lindfors, Grankulla (FI); Robert Bjorkenheim, Helsinki (FI); Gustav Stromberg, Helsinki (FI); Leena Hupa, Abo (FI); Peter Uppstu, Abo (FI); Jukka Pajarinen, Menlo Park, CA (US)

(73) Assignee: BonAlive Oy, Turku, FL (US)

( * ) Notice: Subject to any disclaimer, the term of this patent is extended or adjusted under 35 U.S.C. 154(b) by 772 days.

(21) Appl. No.: 16/339,951

(22) PCT Filed: Oct. 4, 2017

(86) PCT No.: PCT/FI2017/050693
§ 371 (c)(1),
(2) Date: Apr. 5, 2019

(87) PCT Pub. No.: WO2018/065665
PCT Pub. Date: Apr. 12, 2018

(65) Prior Publication Data
US 2020/0038547 A1 Feb. 6, 2020

(30) Foreign Application Priority Data

Oct. 5, 2016 (EP) .................................... 16192500

(51) Int. Cl.
*A61L 27/10* (2006.01)
*A61F 2/28* (2006.01)
(Continued)

(52) U.S. Cl.
CPC ................ *A61L 27/10* (2013.01); *A61F 2/28* (2013.01); *A61L 27/34* (2013.01); *A61L 27/54* (2013.01);
(Continued)

(58) Field of Classification Search
CPC .......... A61L 27/10; A61L 27/34; A61L 27/54; A61L 2430/02; A61L 27/56; A61F 2/28;
(Continued)

(56) References Cited

U.S. PATENT DOCUMENTS 5,236,458 A * 8/1993 Ducheyne ............. C03C 14/002
623/23.56
5,990,380 A * 11/1999 Marotta ................ A61L 31/088
427/2.28
(Continued)

FOREIGN PATENT DOCUMENTS

CN 102631701 A 8/2012
CN 105246518 A 1/2016
(Continued)

OTHER PUBLICATIONS

EPO Communication dated Jun. 8, 2021 in counterpart European application 17 857 893.6.
(Continued)

*Primary Examiner* — Melanie R Tyson
*Assistant Examiner* — Melissa A Hoban
(74) *Attorney, Agent, or Firm* — Timothy H. Van Dyke; Wolter Van Dyke Davis, PLLC

(57) ABSTRACT

The present invention relates to a bone implant comprising a porous body comprising particles of bioactive glass having a particle size of at least 500 μm, wherein the composition of the bioactive glass is 45-59 weight-% of $SiO_2$, 18-25 weight-% of $Na_2O$, 17-25 weight-% of CaO and 0.1-6 weight-% of $P_2O_5$, and a film having a thickness of 10 μm-200 μm, made of a biocompatible polymer and arranged at least partially around the body.

14 Claims, 4 Drawing Sheets
Specification includes a Sequence Listing.

(51) Int. Cl.
  *A61L 27/34* (2006.01)
  *A61L 27/54* (2006.01)
  *A61F 2/30* (2006.01)

(52) U.S. Cl.
  CPC .......... *A61F 2002/2835* (2013.01); *A61F 2002/30225* (2013.01); *A61F 2002/30322* (2013.01); *A61F 2002/30968* (2013.01); *A61F 2310/00329* (2013.01); *A61L 2430/02* (2013.01)

(58) Field of Classification Search
  CPC .... A61F 2002/2835; A61F 2002/30225; A61F 2002/30322; A61F 2002/30968; A61F 2310/00329; A61F 2/30942
  See application file for complete search history.

(56) References Cited

U.S. PATENT DOCUMENTS

| | | | | |
|---|---|---|---|---|
| 6,165,486 A | * | 12/2000 | Marra | A61L 27/46 424/428 |
| 6,328,990 B1 | * | 12/2001 | Ducheyne | A61L 27/32 424/422 |
| 6,406,498 B1 | * | 6/2002 | Tormala | A61L 27/446 623/23.75 |
| 6,607,557 B1 | * | 8/2003 | Brosnahan | A61F 2/4455 623/23.76 |
| 8,449,904 B1 | * | 5/2013 | Jung | A61L 27/56 424/443 |
| 2002/0160175 A1 | * | 10/2002 | Pirhonen | A61F 2/2803 428/297.4 |
| 2004/0009228 A1 | * | 1/2004 | Tormala | A61L 24/0089 424/486 |
| 2004/0166304 A1 | * | 8/2004 | Vallittu | A61L 27/16 428/313.3 |
| 2004/0254259 A1 | * | 12/2004 | Ricci | A61F 2/28 523/113 |
| 2008/0226688 A1 | * | 9/2008 | DePaula | A61L 27/3847 424/423 |
| 2009/0197221 A1 | * | 8/2009 | Marshall, Jr. | A61K 6/836 433/217.1 |
| 2010/0047309 A1 | | 2/2010 | Lu et al. | |
| 2010/0203155 A1 | * | 8/2010 | Wei | A61F 2/4603 606/86 R |
| 2010/0286692 A1 | * | 11/2010 | Greenhalgh | A61B 17/7258 606/63 |
| 2013/0101673 A1 | * | 4/2013 | Borden | A61L 27/40 424/490 |
| 2014/0271779 A1 | | 9/2014 | Bagga et al. | |
| 2014/0271786 A1 | | 9/2014 | Bagga et al. | |
| 2014/0277578 A1 | | 9/2014 | Day et al. | |
| 2015/0056131 A1 | * | 2/2015 | Bernasconi | B29C 51/002 424/9.1 |
| 2015/0105748 A1 | * | 4/2015 | McBride | A61M 5/1452 604/218 |
| 2015/0196339 A1 | * | 7/2015 | Trieu | A61B 17/866 606/309 |
| 2016/0184475 A1 | * | 6/2016 | Zanotto | A61L 27/58 424/602 |
| 2017/0056553 A1 | * | 3/2017 | Pomrink | A61L 27/16 |
| 2018/0296450 A1 | * | 10/2018 | Ramana | A61K 8/21 |

FOREIGN PATENT DOCUMENTS

| | | | |
|---|---|---|---|
| EP | 1 433 489 A1 | 6/2004 | |
| EP | 2 668 967 A1 | 12/2013 | |
| JP | 2004-529687 A | 9/2004 | |
| JP | 2016-517319 A | 6/2016 | |
| JP | 2018-521754 A | 8/2018 | |
| WO | 02087647 A1 | 4/2002 | |
| WO | 02/074356 A | 9/2002 | |
| WO | 2008088411 A1 | 7/2008 | |
| WO | WO-2012011878 A1 * | 1/2012 | ........... A61F 2/28 |
| WO | 2014152113 A2 | 3/2014 | |
| WO | WO-2016060947 A1 * | 4/2016 | ....... A61B 17/8811 |
| WO | 2017/005637 A1 | 12/2017 | |

OTHER PUBLICATIONS

First Official Action dated Apr. 6, 2021 in counterpart Chinese application 2017800609331.

Notice of Reasons for Refusal dated Aug. 6, 2021 in counterpart Japanese application 2019-535,338.

Bretcanu et al., "Poly-DL-Lactic Acid Coated Bioglass Scaffolds: Toughening Effects and Osteosarcoma Cell Proliferation," 47 J.Mater. Sci. 5661 (2012).

* cited by examiner

SEQUENCE LISTING

<160> NUMBER OF SEQ ID NOS: 6

<210> SEQ ID NO 1
<211> LENGTH: 20
<212> TYPE: DNA
<213> ORGANISM: Artificial Sequence
<220> FEATURE:
<223> OTHER INFORMATION: primer

<400> SEQUENCE: 1
cacccatggc agaagaagga                                               20

<210> SEQ ID NO 2
<211> LENGTH: 20
<212> TYPE: DNA
<213> ORGANISM: Artificial Sequence
<220> FEATURE:
<223> OTHER INFORMATION: primer

<400> SEQUENCE: 2
atccgcatga tctgcatggt                                               20

<210> SEQ ID NO 3
<211> LENGTH: 20
<212> TYPE: DNA
<213> ORGANISM: Artificial Sequence
<220> FEATURE:
<223> OTHER INFORMATION: primer

<400> SEQUENCE: 3
gagtccccaa acaacctcca                                               20

<210> SEQ ID NO 4
<211> LENGTH: 20
<212> TYPE: DNA
<213> ORGANISM: Artificial Sequence
<220> FEATURE:
<223> OTHER INFORMATION: primer

<400> SEQUENCE: 4
tgagtgagga gcacgtagga                                               20

<210> SEQ ID NO 5
<211> LENGTH: 20
<212> TYPE: DNA
<213> ORGANISM: Artificial Sequence
<220> FEATURE:
<223> OTHER INFORMATION: primer

<400> SEQUENCE: 5
cgagctgaac gggaaactca                                               20

<210> SEQ ID NO 6

```
<211> LENGTH: 20
<212> TYPE: DNA
<213> ORGANISM: Artificial Sequence
<220> FEATURE:
<223> OTHER INFORMATION: primer

<400> SEQUENCE: 6
tgggtggcac tgttgaagtc                                                    20
```

BONE IMPLANT

FIELD OF THE INVENTION

The present invention relates to a bone implant. More specifically, the present invention relates to bone implants useful for replacing an entire section of a bone.

BACKGROUND OF THE INVENTION

Treatments of large bone defects and non-unions are challenging problems, usually requiring transplantation of autologous bone. Although autograft bone is one of the most commonly transplanted tissues, it has disadvantages such as a limited supply especially in children and elderly patients. Harvesting of bone also results in donor site pain and may lead to other problems, such as infection of the harvesting site and problems in re-formation of bone at the harvesting site. A variety of bone substitutes are available, including synthetic materials, such as bioactive glass (BAG) and calcium sulphate- and calcium phosphate based materials. These substitutes differ in osteogenic, osteopromoting and osteoconducting properties and in their capacity to affect bone formation and growth.

Restoration of function and regeneration of bone in diaphyseal bone defects is still a major clinical challenge. In 2000, Masquelet and co-workers introduced a two-stage technique for the treatment of diaphyseal bone defects, which combines an induced membrane-technique with the use of cancellous autografts. This is today known as the Masquelet technique.

In a first procedure of the Masquelet technique, a polymethyl methacrylate (PMMA) spacer is inserted into the bone defect. After the insertion, a pseudo-synovial membrane will subsequently form around the spacer. During a second operation, the spacer is removed and the defect is reconstructed using autologous cancellous bone grafts. Although, the induced membrane is known to increase e.g. vascular endothelial growth factor (VEGF) secretion, the inductive capacity has been observed to continuously diminish with time. Furthermore, the technique, albeit an efficient one for bone re-formation, needs two operations on the patient.

In the field of bone tissue engineering, degradable, biocompatible composite materials made of synthetic polymers, e.g. polylactide (PLA), polyglycolid acid (PGA) or poly(lactide-co-glycolide) (PLGA), or collagens that are animal derived polymers, combined with calcium phosphate ceramics or bioactive glasses (BAGs) are being increasingly studied.

Some BAGs are suitable to be used as bone substitutes as they have osteoconductive and osteostimulative properties. These characteristics depend on a dissolution process at the glass surface which begins immediately after implantation. The reaction starts with a rapid sodium hydrogen ion exchange with subsequent dissolution and re-polymerisation of silica, which is followed by nucleation and crystallization of calcium phosphate to hydroxyapatite at the surface of the glass. The surface reactions give rise to an elevated pH and increased osmotic pressure, which explains the antibacterial properties observed e.g. for BAG-S53P4 (the composition of which will be indicated below).

The degradation products of poly(α-hydroxy esters) are acidic with a subsequent decrease of pH in the vicinity of the implanted material. Acidic or other types of degradation products may give rise to an inflammatory response in the surrounding tissue. However, many degradable polymers lack osteogenic and angiogenic activity.

Angiogenesis including growth of blood vessels from pre-existing vessels is a prerequisite for bone formation. It is a complex phenomenon involving oxygen and several cell types, such as mature and progenitor endothelial cells, leukocytes and platelets, as well as growth factors, e.g. vascular endothelial growth factor (VEGF), a multi-tasking cytokine, which is known to possess a central role in the blood forming process.

Document US 2014/0277578 presents a biodegradable composite scaffold for repairing defects in load-bearing applications. It comprises a core of generally co-aligned biodegradable glass fibres surrounded by a polymer layer. The fibres can be replaced with biodegradable glass particles having a particle size of 40-425 μm.

Definitions

The terms used in this application, if not otherwise defined, are those agreed on at the consensus conference on biomaterials in 1986, see Williams, D F (ed.): Definitions in biomaterials: Proceedings of a consensus conference of the European Society for Biomaterials, Chester, England. March 3-5, 1986. Elsevier, Amsterdam 1987, and Williams D F, Black J, Doherty P J. Second consensus conference on definitions in biomaterials. In: Doherty P J, Williams R L, Williams D F, Lee A J (eds). Biomaterial-Tissue Interfaces. Amsterdam: Elsevier, 1992.

In this application, by bioactive material is meant a material that has been designed to elicit or modulate biological activity. Bioactive material is often surface-active material that is able to chemically bond with the mammalian tissues.

The term resorbable in this context means that the material is disintegrated, i.e. decomposed, upon prolonged implantation when inserted into mammalian body and when it comes into contact with physiological environment. Especially, the term resorbable glass means silica-rich glass that does not form a hydroxyl-carbonate apatite layer on its surface when in contact with physiological environment. Resorbable glass disappears from the body through resorption and does not significantly activate cells or cell growth during its decomposition/dissolution process.

By biomaterial is meant a material intended to interface with biological systems to evaluate, treat, augment or replace any tissue, organ or function of the body. By biocompatibility is meant the ability of a material used in a medical device to perform safely and adequately by causing an appropriate host response in a specific location. By resorption is meant decomposition of biomaterial. By composite is meant a material comprising at least two different constituents, for example a polymer and a ceramic material, such as glass.

The term particle refers to an entity of irregular shape and having certain dimensions. Particles are different from fibres, wherein fibres are defined as having a length and a diameter, the diameter being the largest dimension of the fibre, transverse to its length. A fibre has thus a lengthwise dimension which is at least about 10 times the diameter of the fibre. The term particle size refers to the largest dimension of the particle. By granules, it is meant particles that have any regular or irregular shape.

In the present description, the abbreviation wt-% stands for weight percentage, and is typically expressed as a weight percentage of the total weight. The molecular weight is the mean molecular weight, which is here the number average molecular weight, and is expressed as g/mol.

OBJECTS AND SUMMARY OF THE INVENTION

It is an aim of the present invention to at least partially solve the above-mentioned problems. For example, the present invention aims at providing a bone implant material that does not require use of autologous bone, thus avoiding problems of harvesting the bone, complications related to bone harvesting as well as post-operative pain. Another aim is to provide a material that does not require a second operation, as the presently known Masquelet-technique does. It is indeed an aim to provide a bone implant material that is easy and safe to use, requires only one surgical operation and causes less pain and discomfort to the patient while also reduces risks, e.g. postoperative infection complications related to surgical operations and other complications due to the antibacterial effect.

The present invention relates to a bone implant comprising
- a porous body comprising particles of bioactive glass having a particle size of at least 500 μm, wherein the composition of the bioactive glass comprises 45-59 weight-% of $SiO_2$, 18-25 weight-% of $Na_2O$, 17-25 weight-% of CaO and 0.1-6 weight-% of $P_2O_5$, and
- a film having a thickness of 10 μm-200 μm, made of a biocompatible polymer and arranged at least partially around the body.

The present invention relates also to a method of manufacturing a bone implant as described above, comprising forming a porous body comprising particles of bioactive glass, arranging a film made of a biocompatible polymer at least partially around the porous body and heating the combination to a glass transition temperature of the biocompatible polymer.

DETAILED DESCRIPTION OF THE INVENTION

Figure 1:
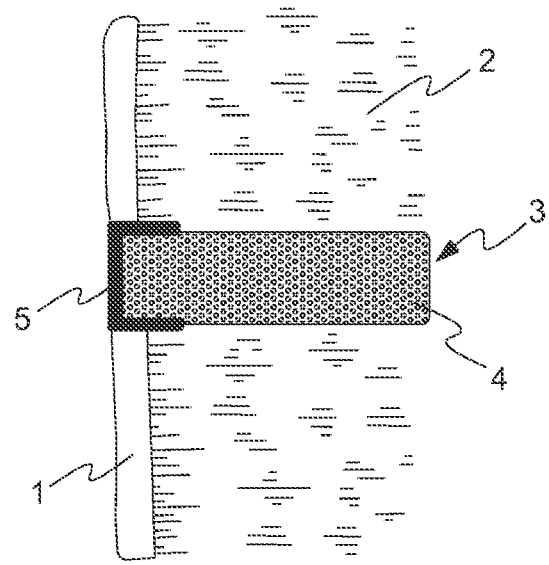
FIG. 1 schematically illustrates a bone implant according to an embodiment, when implanted in a bone.

The present invention relates to a bone implant comprising
- a porous body comprising particles of bioactive glass having a particle size of at least 500 μm, wherein the composition of the bioactive glass comprises 45-59 weight-% of $SiO_2$, 18-25 weight-% of $Na_2O$, 17-25 weight-% of CaO and 0.1-6 weight-% of $P_2O_5$, and
- a film having a thickness of 10 μm-200 μm, made of a biocompatible polymer and arranged at least partially around the body.

The present invention thus provides a bone implant that combines a bioactive glass and a polymer film. The combination of polymer film with a low film thickness (below 200 μm) and high particle size (above 500 μm) leads to a synergistic effect. Indeed, the polymer film is thin enough to allow rapid enough resorption and thereafter tissue ingrowth. Large particles are needed for the large defects for which the present implant is to be used. Indeed, small particles have a too high reactivity and risk to irritate the surrounding tissue and thus the particles need to be rather large. According to an embodiment, at least a majority of the particles have a particle size above 1000 μm (1 mm). For example, more than 70, 80, 90 or 95 wt-% of the total amount of particles have a particle size of above 1000 μm. In this application, by large defect are meant defects having a size of 10 cc (cubic centimetre) or more. The defect can for example have a size of 20 cc or more, or be even larger.

The bone implant is especially suitable to be used similarly as the materials in the Masquelet technique. Indeed, the BAG itself creates a certain amount of positive irritation, necessary for the formation of pseudo-synovial membrane and this effect is further enhanced by the polymeric material. The BAG and polymeric material are thus selected such that they both have an impact on the formation of pseudo-synovial membrane, when the bone implant is implanted. The bone implant is for implantation into a bone defect, where a bone defect can be caused by an accident, by surgery or it may be a bone defect that has been formed during the growth of the subject. Indeed, bone defects may be caused for example by severe accidents where a part of a bone is so crushed that it must be removed, or due to an illness such as cancer that requires removal of a part of a bone.

In the induced membrane Masquelet-technique the second operation is usually performed between four to eight weeks. The induced membrane has osteogenesis-improving effect which, however, appears to decrease over time. It has been speculated that the optimal time for performing second-stage surgery may be within six weeks after implantation of foreign material. According to the present results (see below in the Experimental part), the inductive capacity of PMMA on VEGF expression seems to be lowest at eight weeks, the time when most of the operations are performed. The present bone implant thus provides a material that can be used in the same manner as traditionally is used in the Masquelet-technique, but the second operation is not needed. This significantly improves the final results, as basically half of the risks of infection and wound complications are avoided simply because a second operation is not needed. Furthermore, as the BAG typically has antibacterial properties, the risk of infection of even after the first operation, i.e. implantation of the bone implant, is reduced. The overall cost is thus significantly lower and patient satisfaction can be assumed to be increased.

Indeed, by coating the BAG in a study (as described below in the Experimental part), with a degradable polymer, poly(D,L-lactide-co-glycolide) (PLGA), the aim was to delay the BAG reaction with the surrounding tissue until the induced membrane is created, thus preventing resorption of the BAG. It was observed that the polymer was resorbed and what was left was an induced membrane surrounding the BAG, initiating the favourable reactions of the BAG at the time when growth factor secretion from the induced membrane is at its highest. This also means that the two-stage operation technique developed by Masquelet now is reduced to a single-stage operation, as mentioned above.

The bone implant may also contain 0-2 weight-% of other elements, such as magnesium, fluor, boron, copper, cobalt, silver, zinc and strontium to further promote osteogenesis and angiogenesis through the release of the ionic dissolution products.

The body made of BAG is porous. The porosity can be for example 10-90% or 10-70% as measured by microcomputed tomography. This method is described in the article Quantitative characterization of porous commercial and experimental bone graft substitutes with microcomputed tomography, Ylä-Soininmäki A, Moritz N, Turco G, Paoletti S, Aro H T, J Biomed Mater Res B Appl Biomater. 2013 November; 101(8):1538-48. doi: 10.1002/jbm.b.32975. The typical porosity of BAG is about 24-36% and by porosity is here meant that the body is not completely solid but rather that bodily fluids can enter the core of the body. The body thus has interconnecting porosity. This enhances formation of new bone and vascularisation within the pores of the implant. The porosity of the body can be for example from 10, 15, 20, 25, 30, 35, 40, 45, 50, 55, 60, 70, 75, 80 or 85% up to 15, 20, 25, 30, 35, 40, 45, 50, 55, 60, 70, 75, 80, 85 or 90%.

The particle size of BAG within the body is at least 500 µm. Typically, the particle size of BAG is 500-3150 µm. The particle size can be for example from 500, 550, 600, 650, 700, 800, 850, 900, 1000, 1200, 1400, 1500, 1800, 2000, 2200, 2500, 2800 or 3000 µm up to 550, 600, 650, 700, 800, 850, 900, 1000, 1200, 1400, 1500, 1800, 2000, 2200, 2500, 2800, 3000 or 3150 µm.

The body made of BAG is at least partially covered by a polymeric film. The polymeric film may also cover the body entirely. According to an embodiment, the film is arranged around the body so as to cover the part of the body in contact with muscle, fascia or periosteum when the implant is implanted in a bone. According to another embodiment, the body is in the form of a disc and the film is arranged around the sides of the disc. For example, when the implant is in the form of a disc, cylinder or cube having a certain thickness, the film can be arranged on the sides of the disc, cylinder or cube and optionally partially over the top and bottom surfaces of the disc. The film can also be arranged only partially on the sides or only on one of the top or bottom surfaces. The implant can also have the form of a wedge or a part of a sphere (such as a half of a sphere), where the film is preferably arranged at least on the surface that will be in contact with the soft tissue, once the implant is in its place. The present implant can also be cast in any suitable form if required.

The polymeric film can be made of any suitable biocompatible polymer. By suitable it is here meant, as discussed above, a polymer that is capable of inducing formation of pseudo-synovial membrane when the implant is implanted into a bone defect. Indeed, the polymer used is a biocompatible polymer. It is preferably also biodegradable and can be for example a poly(α-ester), e.g. polylactide (PLA), polyglycolide (PGA), poly(lactide-co-glycolide) (PLGA), polycaprolactone (PCL), polydioxanone (PDS), poly(trimethylene carbonate) (PTMC), polyhydroxyalkanoate, e.g. poly(3-hydroxybutyrate) (PHB), poly(propylene fumarate) as well as copolymers of aromatic and aliphatic polyesters. It may also be a polyurethane or a poly(ether), e.g. poly(ethylene glycol) (PEG), poly(propylene glycol) (PPG). Some other suitable polymers are polyols e.g. poly(vinyl alcohol) (PVA), polyacetals, polycarbonates, poly(ester amides), poly(ortho esters), polyanhydrides, polyamides, poly(amino acids), poly(alkyl cyanoacrylates), polyphosphazenes, polyphosphoesters, poly(aspartic acid), polysiloxanes or proteins such as collagen, elastin, albumin or fibrin. It may still further be a polysaccharide, such as cellulose, chondroitin sulfate, chitin, chitosan, alginic acid or hyaluronic acid. Various blends, composites, copolymers and modifications of the above listed polymers may also be used.

According to an embodiment, the polymer is selected from a group consisting of polylactide, polyglycolide, poly(lactide-co-glycolide) polycaprolactone, mixtures thereof and their mixtures with polyethylene glycol. When poly(ethylene glycol) (PEG) is used, its molecular weight can be for example from 1000-50000 g/mol, for example about 3000 g/mol or 35000 g/mol. The molecular weight of PEG can be for example from 1000, 2000, 3000, 4500, 5000, 7000, 10000, 15000, 20000, 27000, 30000, 35000 or 40000 g/mol up to 2000, 3000, 4500, 5000, 7000, 10000, 15000, 20000, 27000, 30000, 35000, 40000, 45000 or 50000 g/mol. By mixtures of the polymers are meant both blends and copolymers of the monomers used in the manufacturing of the polymers. The polymeric film may also be formed during the manufacturing of the bone implant, i.e. the porous body may be covered by monomers or a mixture of monomers followed by polymerisation. In such a case, the film will be also present inside the body, up to a certain distance from the outer surface of the body.

The thickness of the film is 10-200 µm, for example 100-200 µm. Indeed, the thickness of the film can be from 10, 20, 30, 40, 50, 60, 70, 80, 90, 100, 110, 120, 130, 140, 150, 160, 170 or 180 µm up to 20, 30, 40, 50, 60, 70, 80, 90, 100, 110, 120, 130, 140, 150, 160, 170, 180, 190 or 200 µm.

In one embodiment, the film comprises bioactive glass. Preferably, the bioactive glass is in the form of a powder, i.e. it has an average particle size that is below 45 µm. The BAG used may be the same or a different from that used in the body and it may also be a mixture of two or more different BAGs. The amount of BAG can be for example from 1 to 40 wt-% of the total weight of the film with BAG. The amount can be for example from 1, 2, 3, 4, 5, 10, 15, 20, 25, 30 or 35 wt-% up to 2, 3, 4, 5, 10, 15, 20, 25, 30, 35 or 40 wt-%. The powder can be made for example by crushing a block of glass or granules of glass.

The composition of the bioactive glass is as has been described above. Within these ranges, one preferred subrange for the composition of the bioactive glass is 45-54 weight-% of $SiO_2$, 22-25 weight-% of $Na_2O$, 19-25 weight-% of $CaO$ and 3.5-6 weight-% of $P_2O_5$. Another preferred composition of bioactive glass is 53 weight-% of $SiO_2$, 23 weight-% of $Na_2O$, 20 weight-% of $CaO$ and 4 weight-% of $P_2O_5$. This glass is also known as S53P4-glass and sold under the trade name of BonAlive®.

A yet further preferred composition of bioactive glass is 45 weight-% of $SiO_2$, 24.5 weight-% of $Na_2O$, 24.5 weight-% of $CaO$ and 6 weight-% of $P_2O_5$, also known as the Hench glass and sold under the trade name of NovaBone®. The BAG used in the body may also be a mixture of two or more different BAGs as described above.

The body may be in the form of sintered bioactive glass particles, or the body may be in the form of bioactive glass particles held together by a biodegradable polymer. In this latter embodiment, the biodegradable polymer can be selected from a group consisting of polylactide, polyglycolide, poly(lactic-co-glycolide), polycaprolactone, poly(ethylene glycol), natural collagen polymers and mixtures thereof.

The present bone implant may be manufactured in various ways, of which two are explained in more detail. Indeed, the porous body made of BAG can be manufactured by arranging BAG particles in a mould, adding the polymer in liquid form (for example in a solution), followed by lyophilisation, i.e. evaporation of the liquid from the polymer solution. Thereafter, a polymeric film prepared separately is arranged around the body thus formed and heated to approximately the Tg of the polymer, in order to slightly soften the film so that it adheres well to the body made of BAG.

In another embodiment, the body is manufactured by sintering, i.e. particles of BAG are arranged in a mould, which is then heated to a high temperature so that the particles attach to each other, i.e. are sintered. The temperature is typically about 500-700° C. Thereafter, the polymeric film is arranged around the body as explained above.

DETAILED DESCRIPTION OF THE DRAWING

FIG. 1 illustrates a bone implant according to an embodiment, when implanted in a bone. The Figure shows the cortex 1 of the bone, as well as the underlying cancellous bone 2. A bone implant 3 has been implanted in a defect in the bone. The bone implant 3 has a body 4 made of sintered bioactive glass particles in the form of a cylinder and one end of the body 4 is covered by a polymeric film 5. The film 5 is arranged such that the part of the body 4 that is in contact with cortex 1 when the implant is in place, is covered by the film 5.

Figure 2A:
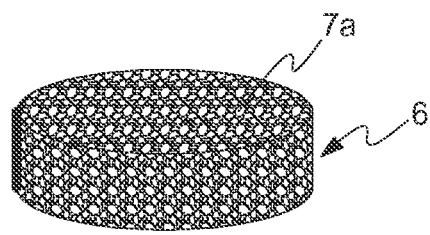
FIG. 2A-2C schematically illustrate a bone implant according to another embodiment.
Figure 2B:
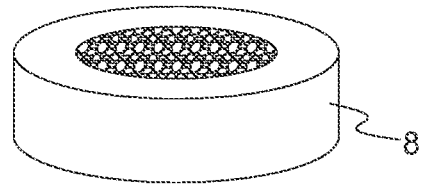
Figure 2C:
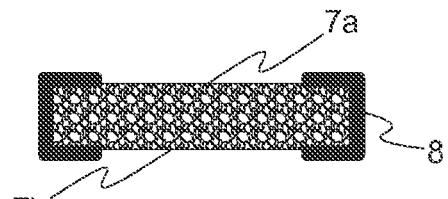

FIGS. 2A-2C illustrate a bone implant according to another embodiment. FIG. 2A shows a disc having a side surface 6 and a top surface 7a. The bottom surface is not visible in FIG. 2A, but it is essentially parallel to the top surface 7. This disc forms the body of the implant and it is made of bioactive glass particles. FIG. 2B shows the same disc partially covered by the film 8 as a partial top view, and FIG. 2C the partially covered disc from a side view. From the side view, one can see that the side surface has been covered by the film 8, as well as part of the bottom surface 7b and top surface 7a, too.

Figure 3A:
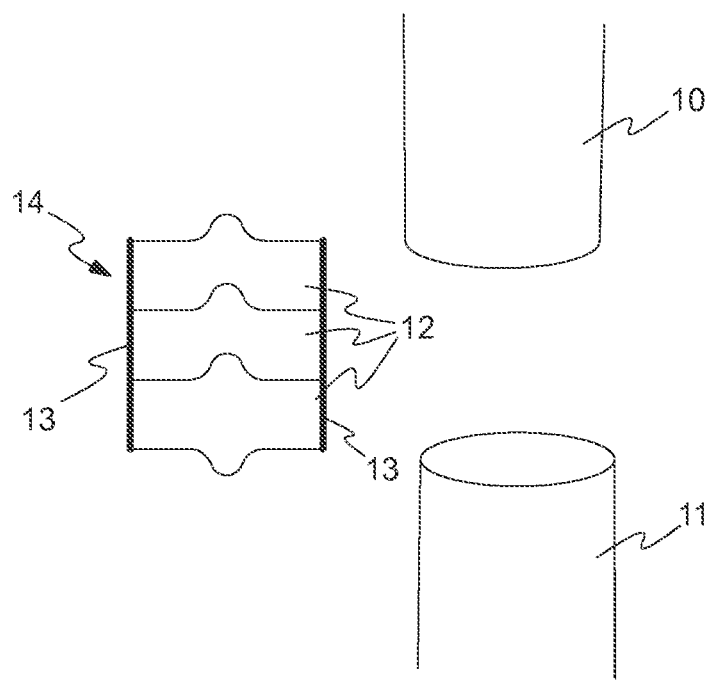
FIG. 3A-3B schematically illustrate a practical use of a bone implant according to an embodiment.
Figure 3B:
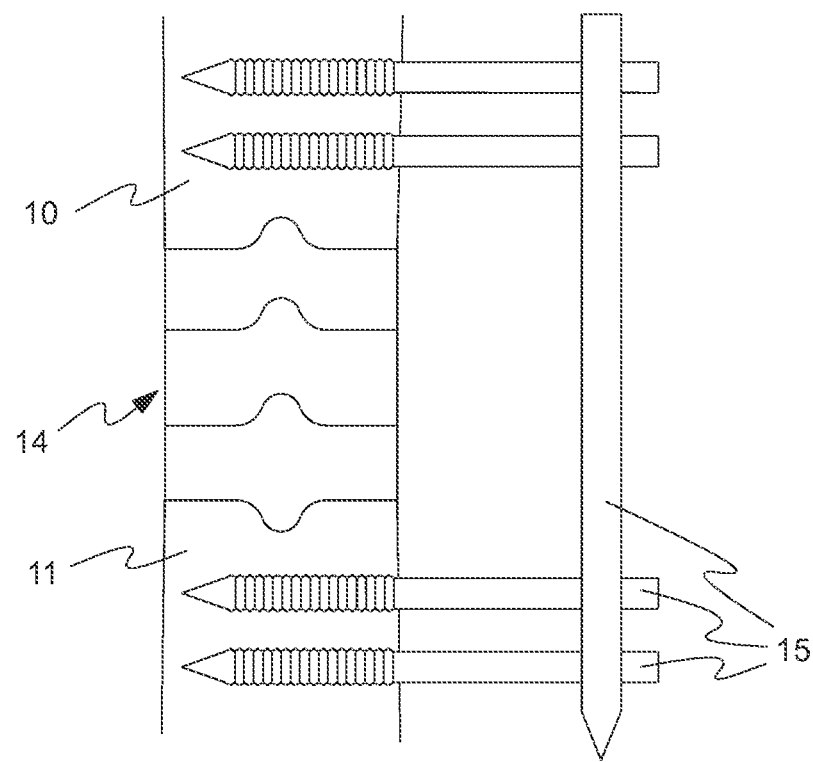

FIGS. 3A and 3B illustrate a practical use of a bone implant according to an embodiment. In this embodiment, the bone implant is used with an external fixation device. The bone 10, 11 contains a defect, like here a piece extending over the entire cross-section of the bone is missing. The bone implant 14 (shown here as a cross-section) is made of three discs 12 forming the body. The outermost discs comprise an extension arranged to fix the bone implant into the bone and a corresponding recess can be created at the ends of the bone parts 10, 11. The side surface of the body is covered by a polymeric film 13. In FIG. 3B the bone implant 14 is shown as arranged between the bone parts 10 and 11. The bone parts have been fixed into place with an external fixing device 15, which is known per se to a person skilled in the art.

Figure 4A:
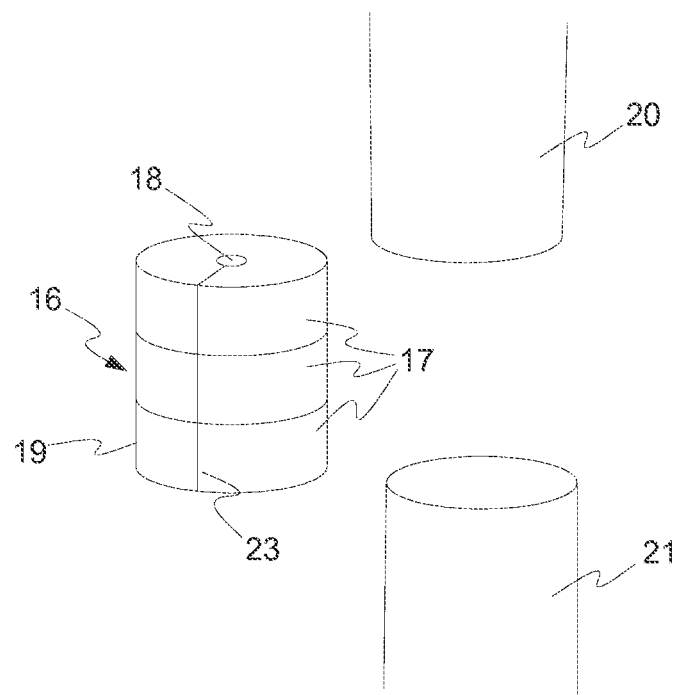
FIG. 4A-4B schematically illustrate another practical use of a bone implant according to another embodiment.
Figure 4B:
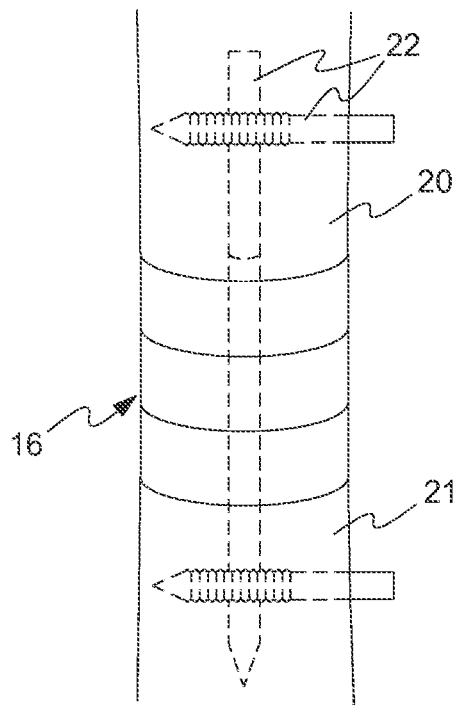

FIGS. 4A and 4B illustrate another practical use of a bone implant according to another embodiment, for intramedullary fixation. In this embodiment, the bone implant 16 comprises also three discs 17 arranged on top of each other, each disc 17 comprising a hole 18 through it, from top surface to bottom surface. A film 19 is arranged to surround the discs, which are cut open at one point (shown with reference number 23), in order to make their placement around the nail (as explained below) easier.

In FIG. 4B, the bone implant 16 is shown between two bone parts 20, 21 and fixed with a nail system 22, wherein a part of the nail system passes through the bone implant via the holes.

Figure 5:
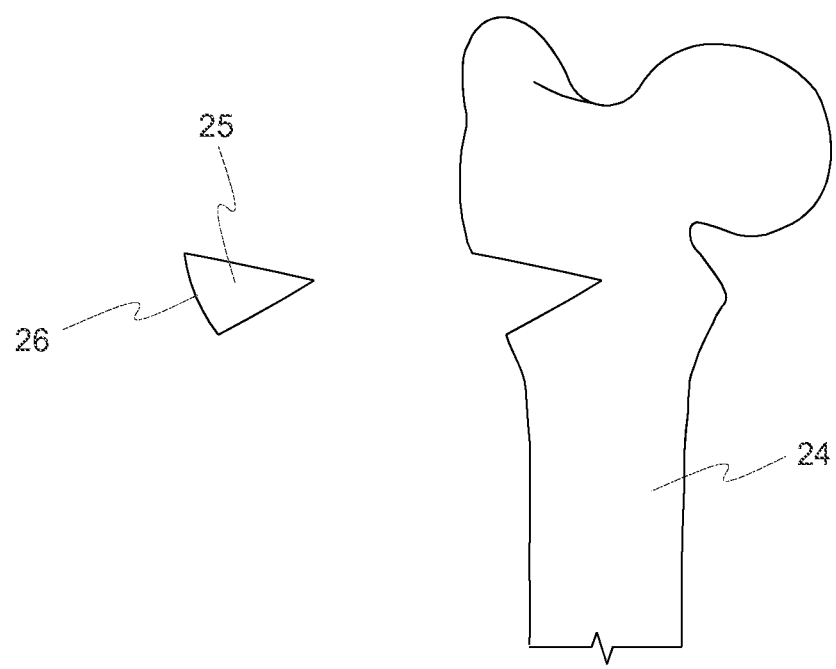
FIG. 5 illustrates a further practical use of a bone implant according to an embodiment.

FIG. 5 illustrates a further practical use of a bone implant according to an embodiment. In this embodiment, a wedge osteotomy is required to a bone 24. The cut-out wedge can be replaced with a wedge-shaped implant 25 made according to the present description. The end 26 of the implant is covered with the film.

EXPERIMENTAL PART

The aim of this experimental part was to evaluate how PLGA-coated BAGs affect the membrane induced VEGF expression, compared to uncoated BAGs, a PMMA spacer or a trauma (control) in an in vivo induced-membrane rabbit model. Due to the significant size difference between humans and rabbits, the particle size of the BAG particles of the body was smaller than 500 µm. It is however believed that the results are transferable to humans and larger particle sizes, i.e. that the tests show the synergistic effect despite the smaller particle size.

Materials and Methods

Bioactive Glass

Bioactive glass S53P4, with a wt-% composition of 53% $SiO_2$, 23% NaO, 20% CaO and 4% $P_2O_5$ was made from mixtures of Belgian sand for $SiO_2$ and analytical grades of $Na_2CO_3$, $CaCO_3$ and $CaHPO_4·2H_2O$. The glass was melted in a platinum crucible for 3 hours at 1360° C. After casting in a preheated graphite mold, the glass was crushed and re-melted for homogenization. Annealed glass blocks were crushed and sieved to a size range fraction of 300-500 µm. The glass particles were sintered in graphite molds at 720° C. in nitrogen atmosphere for 90 minutes to cylindrical rods with the length of 15 mm and a diameter of 5 mm.

Polymer Coating

An acid terminated poly(DL-lactide-co-glycolide) (PLGA) named PDLG5002A with a 50/50 ratio between DL-lactide and glycolide (Corbion, Gorinchem, the Netherlands) was used for coating one end of the sintered BAG rods. The coating was carried out by immersing approximately 2 mm of the end of the BAG implant, in a dichloromethane solution containing 20 wt-% PLGA. The partly coated S53P4+PLGA implants were thereafter dried in air and vacuum. The implants were gamma-sterilized with a dose of 25 kGy. The thickness of the polymer coating on the surface of the bioactive glass was determined from images acquired with scanning electron microscope (SEM) of the cross-section of the implants. The measurements were made from 25 randomly selected spots of the coating. The average coating thickness was 84 µm with a standard deviation of 55 µm. The variation in individual coating thickness measurements ranged from 17 µm to 192 µm. The error margin for each individual measurement was approximately 7 µm due to the image resolution which was used to perform the measurements.

Poly(Methyl Methacrylate), PMMA

Commercially available PMMA bone cement Palacos+G (Heraeus Medical GmbH, Wehrheim, Germany) was mixed according to the manufacturer's instructions. PMMA rods with a length of 15 mm and a diameter of 5 mm size were made under sterile conditions and sterilized in an autoclave oven prior to animal surgery.

Animals and Surgery

Thirty-six skeletally mature rabbits (NZW, Harlan Laboratories) were used. The animal study was approved by the Animal Experimental Board of Finland (ESAVI/440/04.10.07/2014) and the principles of laboratory animal care of the University of Helsinki were strictly followed.

The operations were performed under general anaesthesia using subcutaneous medetomidine hydrochloride and ketamine hydrochloride. A bone defect was performed by drilling a 6 mm horizontal hole from the lateral to the medial part of the distal metaphyseal region of the femur. One 5×15 mm rod of either S53P4, S53P4+PLGA or PMMA was implanted in the created bone defect. The S53P4+PLGA rods were implanted placing the coated end in the cortical region of the bone against soft tissue. Three parallel experiments for each combination of rod and time point were used. Three defects per time point were left empty for control. Cefuroxime, buprenorphine and carprofen were given for 3 days postoperatively to prevent infections and to relieve pain. Postoperatively at 2, 4 and 8 weeks, the animals were euthanized with an overdose of pentobarbital. The membranes induced at the end of the implants as well as at the site of the control hole were collected. For histochemistry the samples were stored in 10% formalin overnight, then washed and stored in 70% ethanol to be further processed. Samples for real-time quantitative polymerase chain reaction (RT-qPCR) analysis were stored in RNA later solution (AM7020) at 4° C. overnight and then stored in sterile tubes at −80° C. to await further processing.

Real-Time Quantitative Polymerase Chain Reaction (RT-qPCR)

Induced-membrane tissue samples of 30-50 mg were homogenized in Trizol solution (Invitrogen/Life Technologies Paisley, UK) with an Ultra-Turrax homogenizer. Total RNA was isolated using the RNeasy Mini Kit (Qiagen, Valencia, CA, USA) according to the manufacturer's instructions. cDNA was synthesized from 600 ng of isolated RNA using an iScript cDNA synthesis kit (BioRad, Hercules, CA, USA) and diluted 1:3 with RNA free water. cDNA synthesis was performed two separate times from the same total RNA samples, and qPCR was performed twice for both samples using iQ5 real-time PCR detection system (BioRad). The reaction mixture for qRTPCR was 10 µl of iQ SYBR green, 7 µl of water, 2 µl of cDNA (20 ng) and 1 µl of 5 µM primers. The primer sequences were as follows; VEGF (247 bp; Acc no. AY196796): sense 5'-CACC-CATGGCAGAAGAAGGA-3', anti-sense 5'-ATCCGCAT-GATCTGCATGGT-3' and for TNF (281 bp; Acc no. NM_001082263): sense 5'-GAGTCCC-CAAACAACCTCCA-3', anti-sense 5'-TGAGTGAG-GAGCACGTAGGA-3'. As a reference gene, GAPDH (207 bp; Acc no. NM_001082253) was used with the following sequence: sense 5'-CGAGCTGAACGGGAAACTCA-3', anti-sense 5'-TGGGTGGCACTGTTGAAGTC-3'. Results were calculated with Gene expression macro for Microsoft Excel, version 1.1 (BioRad).

Haematoxylin and Eosin Staining

Samples of the induced membrane were, after harvesting, fixated in formalin for haematoxylin and eosin (H&E) staining. The samples were embedded in paraffin and cut into 3 µm sections. The sections were deparaffinized and H&E stained.

The H&E stained sections were evaluated for the presence of capillary beds using a Leica DM6000 B/M light microscope connected to a digital camera (DFC420 and DFC365FX; Leica Microsystems, Wetzlar, Germany). The amount of capillary beds in a standardized area with 10× magnification was graded by two authors (RB and GS) in a blinded way on a 3-point scale: 1—low density of capillary beds, 2—moderate density of capillary beds, 3—high density of capillary beds.

Statistical Analysis

One rabbit deceased 3 days after the surgical procedure from diarrhea for an unknown reason, resulting in duplicate samples for PMMA at 2 weeks compared to triplicates for S53P4 and S53P4+PLGA.

One-way ANOVA analysis followed by Sidak's multiple comparison test were used to calculate statistical differences using Prism software (version 7.0a, GraphPad Software, Inc.). $P<0.05$ was chosen as the threshold of statistical significance.

Results

Real-Time Quantitative Polymerase Chain Reaction (RT-qPCR)

A high expression of VEGF for the control membrane was observed at 2 weeks, but the expression levels rapidly declined, not being applicable for analysis at 8 weeks. This was in contrast to the PMMA treated group, for which the expression of VEGF remained constant up to 4 weeks. Relative to the PMMA group, the expression of VEGF for the uncoated S53P4 induced membranes was highly up-regulated at the early 2-week and the middle 4-week time-points, but declined to the level for PMMA at the late 8-week time-point. Interestingly, the PLGA coated S53P4 (S53P4+PLGA) changed the pattern of VEGF expression and, rather than declining over time, a steady increase from low to high VEGF expression over the 8-week period could be observed. The high level of VEGF expression observed for PLGA coated S53P4 compared with PMMA at 8 weeks was significant ($p<0.05$). The results are presented in Table 1.

TABLE 1

| VEGF | 2 weeks | 4 weeks | 8 weeks |
| --- | --- | --- | --- |
| S53P4 + PLGA | 5.7 | 8.9 | 16.8 |
| S53P4 | 14.3 | 22.4 | 5.0 |
| PMMA | 6.9 | 7.0 | 5.3 |
| Control drill | 13.1 | 1.4 | 0.0 |

The TNF expression for the control drill samples was low throughout the follow-up, being inadequate for analysis at 8 weeks. The TNF expression for PMMA reached its peak at 2 weeks, with a declining trend towards the end of the follow-up. Uncoated S53P4 samples showed a peak of TNF expression at 4 weeks. This was in contrast to the PLGA coated S53P4, for which an increase in TNF expression, consistent with the VEGF expression pattern for PLGA-coated S53P4, was observed throughout the follow-up (Table 2). However, no statistically significant differences were seen between the different implants or time-points.

TABLE 2

| TNF-α | 2 weeks | 4 weeks | 8 weeks |
| --- | --- | --- | --- |
| S53P4 + PLGA | 3.3 | 7.8 | 17.8 |
| S53P4 | 2.9 | 13.7 | 2.5 |
| PMMA | 11.2 | 4.5 | 4.2 |
| Control drill | 3.4 | 1.8 | 0 |

Histology

A relatively high presence of capillary beds was observed at 2 weeks in the control drill membrane specimens. The number declined during follow-up and at 8 weeks only a few capillary beds were observed. The PMMA induced membranes showed a similar pattern, but a moderately higher capillary density was observed at 8 weeks than in the control drill.

Compared with the PMMA group, the presence of capillary beds in the BAG induced membranes was more ample at 4 and 8 weeks. Non-coated S53P4 showed a very stable high presence of capillary beds over the different time intervals. Compared with S53P4, PLGA coated S53P4 induced membranes showed an equally high capillary density, except at 4 weeks, when the amount of capillary beds was even higher for S53P4+PLGA (Table 3, which shows the average of three parallel samples).

TABLE 3

| Capillary beds | 2 weeks | 4 weeks | 8 weeks |
|---|---|---|---|
| S53P4 + PLGA | 2.3 | 2.7 | 2.3 |
| S53P4 | 2.3 | 2.3 | 2.3 |
| PMMA | 2.0 | 1.7 | 1.7 |
| Control drill | 2.0 | 1.7 | 1.3 |

The grading of the capillary beds was as follows.
0=no capillaries
1=few capillaries
2=moderate capillaries
3=rich capillaries

DISCUSSION

We evaluated the pro-angiogenetic activity as VEGF expression in an induced membrane formed on the soft tissue interface of S53P4 and PLGA coated S53P4 (S53P4+PLGA) rods in comparison to PMMA, the standard material used in the two-stage induced-membrane technique, at the time of writing this description. Of the combinations of materials tested, only the S53P4+PLGA induced membrane showed a continuous increase in VEGF expression, which was observed to be at its highest level at eight weeks. To our knowledge a similar continuous increase of VEGF expression has not been reported earlier. During the same time period the VEGF expression of the PMMA induced membrane decreased constantly, in concordance with observations in a comparable study in humans as well as in an in vivo rabbit study.

The pro-angiogenetic potential that we observed for BAGs, i.e. the increase of VEGF expression, is consistent with several previous in vitro and in vivo studies. Particles of bioactive glass 45S5 particles have been shown to increase VEGF secretion from human fibroblast cells in a size- and concentration-dependent manner. Fibroblasts stimulated with bioactive glass 45S5 particles are known, from scientific publications, to increase proliferation of human dermal microvascular endothelial cells and enhance neovascularization. 45S5 has also been found to increase the pro-angiogenetic properties of degradable polymers. PLGA spheres containing 10% (w/v) 45S5 particles have been demonstrated to stimulate an increase of VEGF by fibroblasts. Compared with pure poly(D,L-lactide) (PDLLA), an addition of BAG to a PDLLA matrix also stimulated angiogenic signaling in fibroblasts by increasing VEGF secretion in a dose-dependent manner.

It is not known how PLGA coating of BAGs affects VEGF expression in an induced membrane. In general, it is however, known that coating BAGs with a biodegradable polymer decreases the dissolution rate of the glass. The expression pattern in the induced membrane may be explained as follows: according to the expected chemical reactions at the PLGA coated S53P4 surface, the polymer will degrade, subsequently increasing the angiogenic potential of the BAG. Simultaneously with the degradation of the polymer, the surface reactions at the BAG will occur as a continuous release of Ca, Na, P and Si from the BAG in solution has been demonstrated to occur after implantation, thus continuing the increase of VEGF expression observed for BAGs The higher VEFG expression of the S53P4 induced membrane compared to the S53P4+PLGA induced membrane at two weeks suggests that the ions released from S53P4 positively affect the VEGF expression and that the polymer effectively slows down the ion release and the gene expression. This retarding effect can depend on the polymer barrier preventing contact with the uncoated part of the S53P4 scaffold or the ability of the polymer degradation products to neutralize the interfacial solution and thus slow down the ion release rate from the glass. At prolonged implantation the polymer will partly degrade allowing a higher ion release from the S53P4 based structure. This implies that the partly polymer coated scaffold enables a continuous release of ions over a longer period of time at concentrations high enough to support VEGF expression than the uncoated scaffold.

The $Ca^{2+}$ ion is known to play a significant role in the VEGF-regulated multifunctional signalling pathway, which is known to influence the mobilization of $Ca^{2+}$. Bone marrow-derived progenitor cells, important in angiogenesis, have been demonstrated to respond to changes in extracellular calcium, through a calcium-sensing receptor as well. The high VEGF expression for both S53P4 and S53P4+PLGA may depend on the ion release of $Ca^{2+}$, which takes place at the surface of the glass. Scaffolds with incorporated BAGs have also been demonstrated to stimulate neovascularization. The mechanisms are unknown, but they are thought to depend on the $Ca^{2+}$ ion release at the glass surface. The increase in VEGF secretion from human fibroblast cells induced by S53P4 has also been demonstrated to depend on the size of the reacting glass granules, in favour of smaller particles. This may be explained by higher concentrations of ions released from the smaller particles possessing a higher surface area to solution volume ratio, influencing the dissolution process of the glass.

In the induced-membrane technique, the second operation is usually performed between four and eight weeks after the first procedure, but it has been speculated that the optimal time for performing the second-stage surgery may be within a month after implantation of PMMA. This is based on histological observations showing that the vascularization in PMMA-induced membranes is ample in one-month-old samples and decreases to less than 60% in three-month-old samples. This finding is supported by our study, as the inductive capacity of PMMA on VEGF expression seems to be lowest at eight weeks, the time when many operations are performed. In our study, the PMMA-induced membranes and membranes of the control drill showed their highest capillary density at two weeks, with a decreasing trend during follow-up, compared with the BAG-induced membranes, which showed high capillary density throughout the follow-up.

Fracture healing and bone regeneration are complex processes that involve coordinated interplay between the cells of the innate immune system and various osteoprogenitor cells. Fracture healing is initiated by an acute inflammation characterized by production of pro-inflammatory cytokines e.g. TNF that regulate the recruitment and differentiation of mesenchymal stem cells along the chondrogenic and osteogenic lineages. Indeed, a short period of TNF production is crucial for bone regeneration. In the subsequent state of fracture healing, ingrowth of vasculature to the fracture site is crucial for the bone regeneration. This angiogenesis is mediated by growth factors such as VEGF. Thus both TNF and VEGF have been shown to play a key role in the various stages of bone regeneration.

The expression of TNF for PMMA constantly decreased during the eight-week period, in accordance with previously described observations of low VEGF expression for PMMA. For S53P4, which clinically is known to be a well-tolerated bone substitute without observed inflammatory response, an increase of TNF expression was observed at four weeks.

In summary, our study reveals that both uncoated and coated porous S53P4 implants positively affect the expression of VEGF and TNF, resulting in higher amounts of capillary beds observed in histological samples, compared with the lower expression of VEGF and less capillary beds observed in control and PMMA samples.

The induced membrane of PMMA is known to have angiogenetic-improving properties, which, however, appear to decrease over time. In the induced membrane of PLGA coated S53P4, we observed an inductive expression of VEGF that increased with time. At eight weeks, the expression of VEGF was significantly higher for coated S53P4 than for PMMA ($p<0.05$).

The invention claimed is:

1. A bone implant comprising
   a porous body comprising particles of bioactive glass comprising a particle size of at least 500 µm, wherein a composition of the particles of bioactive glass comprises 45-59 weight-% of $SiO_2$, 18-25 weight-% of $Na_2O$, 17-25 weight-% of CaO and 0.1-6 weight-% of $P_2O_5$, wherein the porous body has an outer surface, and
   an external film comprising a thickness of 10 µm-200 µm, made of a biocompatible polymer;
   wherein the external film is provided only on a portion of the outer surface and is arranged on the outer surface so as to contact muscle, fascia or periosteum when the bone implant is implanted in a bone;
   wherein the biocompatible polymer is selected from a group consisting of polylactide, polyglycolide, poly (lactide-co-glycolide), polycaprolactone, natural collagen polymers and their mixtures with polyethylene glycol; and
   wherein the implant induces VEGF expression at at least 8 weeks post implantation.

2. The bone implant according to claim 1, wherein the particle size of the particles of bioactive glass is 500-3150 µm.

3. The bone implant according to claim 1, wherein the thickness of the external film is 100-200 µm.

4. The bone implant according to claim 1, wherein the external film comprises particles of bioactive glass incorporated therewithin.

5. The bone implant according to claim 4, wherein the particles of bioactive glass incorporated into the external film are in the form of a powder comprising an average particle size of less than 45 µm.

6. The bone implant according to claim 5, wherein the particles of bioactive glass of the porous body comprise a different chemical composition than the particles of bioactive glass incorporated into the external film.

7. The bone implant according to claim 1, wherein the composition of the particles of bioactive glass is 45-54 weight-% of $SiO_2$, 22-25 weight-% of $Na_2O$, 19-25 weight-% of CaO and 3.5-6 weight-% of $P_2O_5$.

8. The bone implant according to claim 1, wherein the composition of the particles of bioactive glass is 53 weight-% of $SiO_2$, 23 weight-% of $Na_2O$, 20 weight-% of CaO and 4 weight-% of $P_2O_5$.

9. The bone implant according to claim 1, wherein the porous body is in the form of a disc and the external film is limited to being arranged locally around a side of the disc.

10. The bone implant according to claim 1, wherein the particles of bioactive glass are sintered to each other and thereby form the porous body.

11. The bone implant according to claim 1, wherein the porous body is in the form of bioactive glass particles held together by a biodegradable polymer.

12. The bone implant according to claim 11, wherein the biodegradable polymer is selected from a group consisting of polylactide, polyglycolide, poly(lactic-co-glycolide), polycaprolactone, polyethylene glycol, collagen and mixtures thereof.

13. The bone implant according to claim 1, wherein at least a majority of the particles of bioactive glass comprise a particle size of above 1.0 millimeter.

14. A bone implant comprising
   a porous body comprising particles of bioactive glass comprising a particle size of at least 500 µm, wherein a composition of the particles of bioactive glass comprises 45-59 weight-% of SiO2, 18-25 weight-% of Na2O, 17-25 weight-% of CaO and 0.1-6 weight-% of P2O5, and
   an external film comprised of PLGA and comprising a thickness of 17-192 µm, wherein the implant induces VEGF expression at at least 8 weeks post implantation.

* * * * *